(No Model.) 2 Sheets—Sheet 1.

M. G. HUBBARD.
AUTOMATIC TWINE UNWINDER.

No. 347,804. Patented Aug. 24, 1886.

WITNESSES:

INVENTOR.

(No Model.) 2 Sheets—Sheet 2.
M. G. HUBBARD.
AUTOMATIC TWINE UNWINDER.
No. 347,804. Patented Aug. 24, 1886.
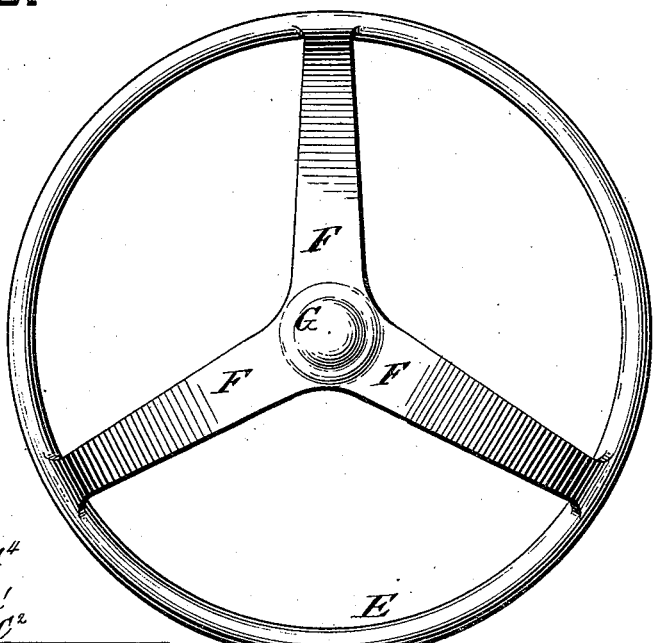
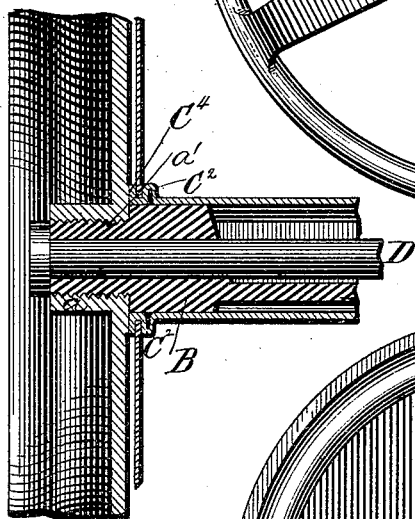
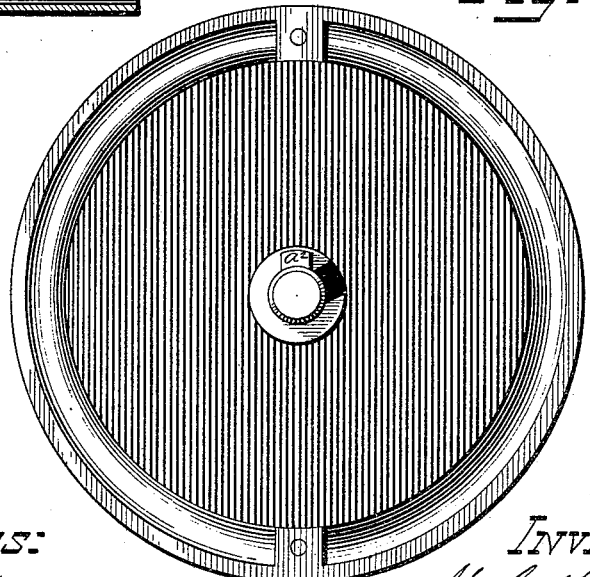
WITNESSES: INVENTOR.

UNITED STATES PATENT OFFICE.

MOSES G. HUBBARD, OF PHILADELPHIA, PENNSYLVANIA.

AUTOMATIC TWINE-UNWINDER.

SPECIFICATION forming part of Letters Patent No. 347,804, dated August 24, 1886.

Application filed March 22, 1886. Serial No. 196,149. (No model.)

*To all whom it may concern:*

Be it known that I, MOSES G. HUBBARD, of the city and county of Philadelphia and State of Pennsylvania, have invented certain new and useful Improvements in Automatic Twine-Unwinders, of which the following is a full and exact description, reference being had to the accompanying drawings, making part of this specification.

My invention relates to that class of devices for unwinding twine similar to that described in an application filed by me January 28, 1886, No. 190,061, and allowed.

My invention consists, first, in the combination of a rim having a hub connected thereto by means of spokes or arms, a shaft, with or upon which said hub is adapted to revolve, and a spool shaft and clamp, as hereinafter described.

It further consists in the combination, with a spool having its ends made in disk form, of a rim adapted to revolve around one end of the spool, whereby all the twine can be easily drawn therefrom.

It further consists in the combination of a spool shaft and clamp, a rim secured to said shaft and capable of revolving around the same, a support or base for the spool shaft and clamp, and means for detachably connecting the same with the base or support.

It further consists in the combination, with the spool support or base, of the arch or bail secured thereto, and having the guiding-eye arranged therein.

It further consists in the combination, with the spool and rim, of a stop for checking the twine when the force or pull ceases thereon.

It further consists in the combination, with the revolving rim and hub connected together by means of the arching spokes or arms forming openings between said hub and rim, of the spool-shaft having the flange or ear formed upon its upper end and projecting above the spool, whereby the shaft can be readily detached from the base or support, all said parts being constructed and operating substantially in the manner, and for the purpose set forth.

My invention is designed for use by merchants, to stand on their counters, and others, who use twine hurriedly or at intervals, and is adapted to avoid the tangling and other troubles which occur in unwinding the balls in which twine is now furnished and used, and to check the unwinding of the twine immediately upon the termination of the force or pull by which it is unwound.

Figure 1:
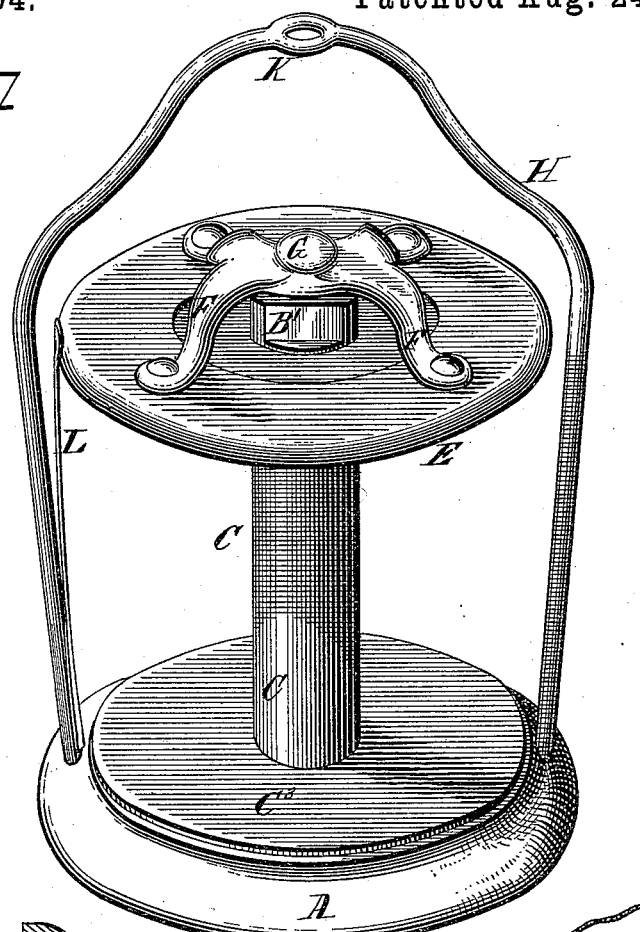
Figure 6:
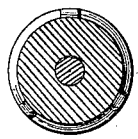
Figure 2:
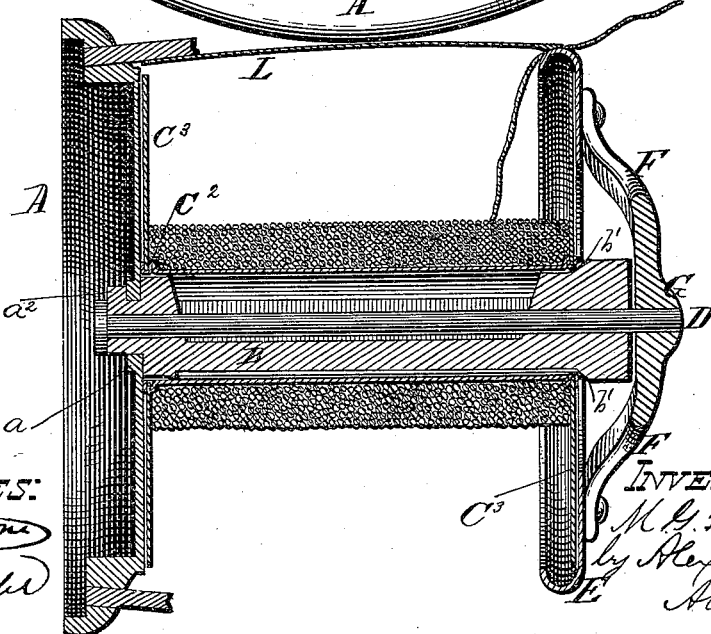

In the accompanying drawings, Figure 1 is a perspective view of the device complete. Fig. 2 is a longitudinal section of the same. Fig. 3 is a plan or top view of a modification in the manner of connecting the rim and hub. Fig. 4 is a bottom view of the device, showing one manner of holding the spool shaft and clamp connected with the base; and Fig. 5 shows a modification of such device. Fig. 6 is a horizontal cross section of the spool C.

The base A is made of any suitable cast material that will polish and finish up neatly, and it is hollowed out on the under side, as shown, to secure lightness and afford room under it for the boss or hub $a$, in which a screw-thread is cut to receive the screw-thread $a'$ on the lower end of the spool shaft and clamp B, as shown in Fig. 5, or the boss or hub is made in cam form, and with which a lug, $a^2$, on the lower end of the spool shaft and clamp engages, as shown in Fig. 2, and by means of either of which constructions a heavy spool of twine may be firmly clamped to the base, and thereby adapt the device for use in any desired position, as well as to stand on a merchant's counter.

On the upper end of the spool shaft and clamp B are formed three slanting projections, $b'$, to fit into and rest upon the upper end of the tubular portion of the spool C, hereinafter referred to, and hold the same firmly in position. This clamp may be made hollow or tubular to permit the rim-shaft D to pass through it, and upon the upper end of this shaft is attached a large rounded rim, E, by the intermediate arms, F, and hub G, and in such manner as to revolve freely with or upon the same. This large rounded rim E is either cast in one piece with the arms and hub, as shown in Fig. 3, or may be formed as shown in Figs. 1 and 2, in which figures it is shown as spun over, out of sheet metal, by suitable machinery for this purpose, and this spun rim is attached to arms or spokes F, connected with the hub, said spokes or arms being so formed at their inner ends as to permit a wrench or the fingers to be applied to a flange or ear, B', formed upon the upper end of the spool shaft and clamp for engaging or disengaging the same from the base.

To the base A is attached an arch or bail, H, which extends over the rim, as shown, and which arch or bail serves the double purpose of a support for the centrally-located guiding-eye, K, and also as a convenient handle or bail for handling or carrying the spool. This arch, when formed as shown, also adds to the neat appearance of the whole device, in which ornamentation is much desired. On one or both sides of the arch is attached a stop, L, to stop the twine, preventing it from spinning off by the continued revolution after the force or pull used to draw off the twine ceases. This stop may be rigid and extend from the side of the arch near enough to the rim to catch and stop the twine, to prevent it from spinning off; or it may be in the form of a light spring touching or approximating the rim, or it may be made slightly stiffer, and act as a light yielding brake upon the rim.

To the device, as above described, a spool is attached, constructed in the following manner: The spool-hub is made of thin sheet metal, having end disks also formed of thin sheet metal. In the drawings the central hub, C', is shown as being formed, as before stated, from thin sheet metal of sufficient diameter to receive the shaft or clamp, and at each end of said hub is formed a small bead or shoulder, C², and upon the ends thus formed are mounted the thin sheet-metal disks C³, perforated centrally, to fit closely around the central hub, the hub being of sufficient length to project slightly beyond the outer face of the disk at each end. After the disks have been thus applied to the hub the projecting edges are bent or turned over, as shown at C⁴, upon the outer faces of the disks. This construction and form of spool adapts the same to hold a large amount of twine within a convenient space, and by this construction and form of spool, in connection with the large rounded rim, the twine is adapted to be drawn freely from the spool at almost any angle, and this large rounded rim provides especially for the drawing of the twine from a spool of this construction near its upper end, where the twine must be drawn from the spool at quite an acute angle, and as the twine is used intermittently and frequently jerked off hurriedly the large rounded revolving rim is indispensable to accomplish it successfully.

The operation of my improved device is as follows: The end of the twine is passed from the spool over the large rounded surface of the rim and up through the centrally-located stationary guiding-eye, and when a sudden jerk or a slight force or pull is exerted upon the twine it will easily and freely slide over the large rounded surface of the rim in a direction lengthwise of the twine, the rim will revolve and thereby avoid the necessity of the sliding of the twine around on the rim in a circular direction to unwind the twine from the spool, and, however stiff or rough the twine may be, or however many knots in the twine, it will not thereby be impeded in sliding lengthwise over the rim, because the circle of the rounded surface (or section) of the rim is so much larger than the obstacles on the surface of the twine that it will slide lengthwise easily and freely, and, however much momentum may be given to the unwinding twine by its revolution, the stop will check it instantly upon the termination of the endwise force or pull upon the same, and thereby prevent it from flying or spinning off from the spool when unwound intermittently.

I have shown in the drawings the rim with a rounded enlarged edge. This construction of rim is disclaimed in this case, as the novel features thereof constitute the subject of my case No. 209,526, filed July 28, 1886.

Having now described my invention, I claim—

1. In a device for unwinding twine, the combination of the rim, a hub connected thereto by means of spokes or arms, a shaft on which said hub is adapted to revolve by the action of the twine upon the rim in drawing the same from the spool, and a stationary spool shaft and clamp by and upon which the spool is held, arranged and operating substantially as and for the purpose set forth.

2. The combination of a spool-shaft to receive and clamp the spool, a rim constructed substantially as described, secured to said shaft and clamp and capable of revolving around the same, a support or base to which the spool shaft and clamp are connected, and means, substantially as described, for detachably connecting the shaft with the base or support, as and for the purpose set forth.

3. The combination, with the base, of the arch or bail secured thereto, and having the guiding-eye arranged therein or connected thereto, substantially as described.

4. The combination, with the spool and revolving rim, of a stop for checking the twine when the force or pull upon the twine ceases, substantially as described.

5. The combination of the base, a spool shaft and clamp having a flange or ear formed upon its upper end and projecting above the spool, and a revolving rim and hub connected together by means of the arching spokes or arms, substantially as set forth.

MOSES G. HUBBARD.

Witnesses:
ALEX. MAHON,
WARREN C. STONE.